(12) United States Patent
Oveyssi et al.

(10) Patent No.: US 6,982,853 B1
(45) Date of Patent: Jan. 3, 2006

(54) DISK DRIVE INCLUDING A STAMPED ARM ASSEMBLY AND METHOD OF MAKING AN ACTUATOR ARM ASSEMBLY

(75) Inventors: Kamran Oveyssi, San Jose, CA (US); Ken L. Chang, Saratoga, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 159 days.

(21) Appl. No.: 10/404,456

(22) Filed: Mar. 31, 2003

(51) Int. Cl.
    *G11B 5/54* (2006.01)
(52) U.S. Cl. .................................. 360/265.9; 360/266
(58) Field of Classification Search ............ 360/265.7, 360/265.8, 265.9, 266, 266.1
    See application file for complete search history.

(56) References Cited

U.S. PATENT DOCUMENTS

| | | | | |
|---|---|---|---|---|
| 4,949,194 A | * | 8/1990 | MacPherson et al. | 360/265.9 |
| 5,184,265 A | * | 2/1993 | Foote et al. | 360/265.9 |
| 5,319,512 A | * | 6/1994 | Grapenthin | 360/265.9 |
| 5,475,549 A | * | 12/1995 | Marder et al. | 360/265.8 |
| 5,677,815 A | * | 10/1997 | Chan | 360/265.7 |
| 5,766,068 A | * | 6/1998 | Kelly | 454/145 |
| 5,924,525 A | * | 7/1999 | Sugimoto | 188/24.21 |
| 5,975,959 A | * | 11/1999 | Joly | 439/630 |
| 6,397,468 B2 | * | 6/2002 | Popowich | 29/897.2 |
| 6,477,017 B2 | * | 11/2002 | Kohei et al. | 360/265.9 |
| 6,529,351 B1 | * | 3/2003 | Oveyssi et al. | 360/264.8 |
| 6,661,615 B2 | * | 12/2003 | Tsuda | 360/265.7 |
| 6,678,120 B2 | * | 1/2004 | Money | 360/264.4 |
| 6,687,094 B2 | * | 2/2004 | Liu et al. | 360/265.7 |
| 6,744,606 B2 | * | 6/2004 | Lau et al. | 360/266 |
| 6,751,068 B1 | * | 6/2004 | Kant et al. | 360/266 |
| 6,836,387 B2 | * | 12/2004 | Ohba et al. | 360/97.01 |

* cited by examiner

*Primary Examiner*—Jefferson Evans
(74) *Attorney, Agent, or Firm*—Alan W. Young, Esq.; Joshua C. Harrison, Esq.

(57) ABSTRACT

An arm assembly of an actuator arm assembly of a disk drive is stamped from a single flat sheet of material and includes first and second actuator arm portions and one or more bendable portions integrally joining the first and second actuator arm portions. A method of making an arm assembly for a disk drive includes steps of providing a flat sheet of material and stamping an arm assembly from the sheet such that the stamped arm assembly includes first and second actuator arm portions and one or more bendable portions integrally joining the first and second actuator arm portions.

15 Claims, 7 Drawing Sheets

DISK DRIVE INCLUDING A STAMPED ARM ASSEMBLY AND METHOD OF MAKING AN ACTUATOR ARM ASSEMBLY

BACKGROUND OF THE INVENTION

1. Field of the Invention

The present invention relates to disk drives. More particularly, the present invention relates to actuator arm assemblies and constituent parts thereof and methods of making such actuator arm assemblies.

2. Description of the Prior Art

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a slider with at least one transducer or read/write element for reading and writing data. The HSA is controllably positioned by a servo system in order to read or write information from or to particular tracks on the disk. The typical HSA has three primary portions: (1) an actuator arm assembly that moves in response to the servo control system; (2) a head gimbal assembly ("HGA") that extends from the actuator arm assembly and biases the slider toward the disk; and (3) a flex cable assembly that provides an electrical interconnect with minimal constraint on movement.

A typical HGA includes a load beam, a gimbal attached to an end of the load beam, and a slider attached to the gimbal. The load beam has a spring function that provides a "gram load" biasing force and a hinge function that permits the slider to follow the surface contour of the spinning disk. The load beam has an actuator end that connects to the actuator arm and a gimbal end that connects to the gimbal that supports the slider and transmits the gram load biasing force to the slider to "load" the slider against the disk. A rapidly spinning disk develops a laminar airflow above its surface that lifts the slider away from the disk in opposition to the gram load biasing force. The slider is said to be "flying" over the disk when in this state.

Figure 1A:
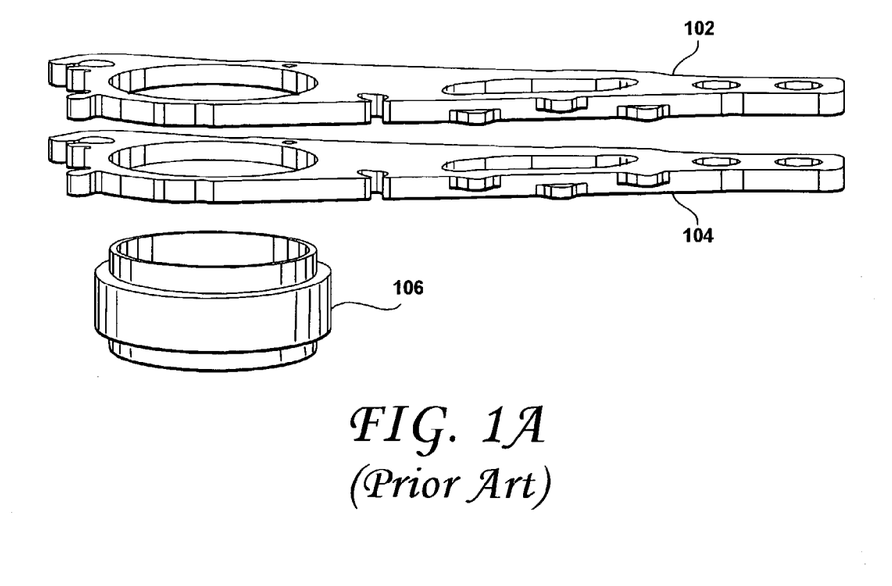
FIG. 1A shows an exploded view of portions of a conventional extruded actuator arm assembly that includes two separate and distinct actuator arms.
Figure 1B:
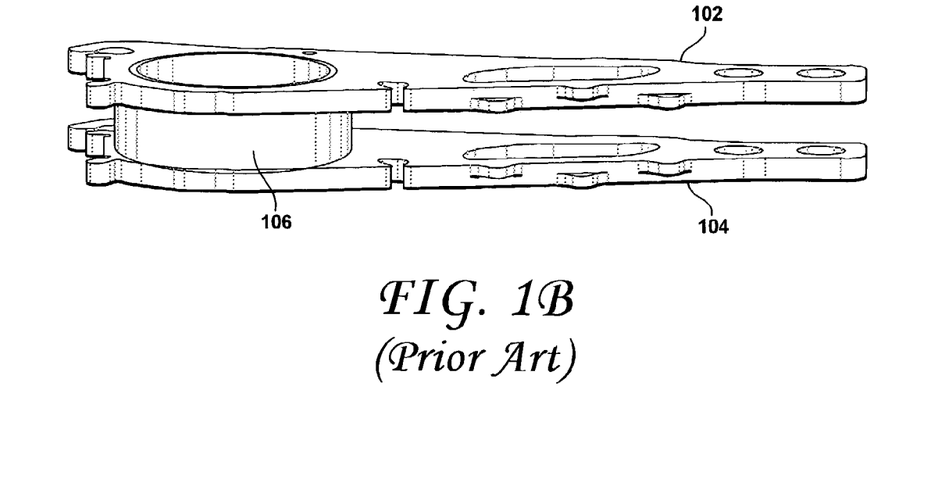
FIG. 1B shows the portions of the extruded actuator arm assembly of FIG. 1A, with the collar fitted to the two separate and distinct actuator arms.

FIG. 1A shows an exploded view of portions of a conventional actuator arm assembly that includes two separate and distinct extruded actuator arms. FIG. 1B shows the portions of the conventional actuator arm assembly of FIG. 1A, with the collar fitted to the two separate and distinct extruded actuator arms. Considering now FIGS. 1A and 1B collectively, the portions of the conventional actuator arm assembly shown include a first actuator arm 102 and a second actuator arm 104 and an actuator assembly collar 106. As shown, each of the conventional actuator arms 102, 104 is a separate and distinct actuator arm and is formed by a relatively costly extrusion process. A chemical polishing step may be carried out to polish the surfaces of the actuator arms and to remove any unwanted artifacts of the extrusion process. The collar 106 may then be fitted to both actuator arms, which stiffens the resultant actuator arm assembly. However, even though the separate and distinct actuator arms 104, 106 are mechanically coupled to one another by the collar 106, the structure nevertheless still suffers from unwanted resonance modes, which detrimentally affect the performance of the disk drive in which such a conventional actuator arm assembly is utilized.

From the foregoing, it may be appreciated that less costly and higher performing alternatives to conventional extruded arm assemblies (an exemplar of which is shown in FIG. 1B) are desirable.

SUMMARY OF THE INVENTION

Accordingly, this invention may be regarded as an arm assembly for a disk drive, the arm assembly being stamped from a single flat sheet of material and comprising a first actuator arm portion, a second actuator arm portion and a first bendable portion integrally joining the first actuator arm portion to the second actuator arm portion.

According to further embodiments, the first actuator arm portion may define a first surface that defines a first through bore and the second actuator arm portion may define a second surface that defines a second through bore that is configured to align with the first through bore. The first bendable portion may be configured to bend such that a major surface of the first actuator arm portion faces and is substantially parallel to a major surface of the second actuator arm portion. A second bendable portion may be disposed away from the first bendable portion, the second bendable portion integrally joining the first actuator arm portion to the second actuator arm portion.

The present invention, according to another embodiment thereof, is an actuator arm assembly for a disk drive, the actuator arm assembly comprising an arm assembly stamped from a single flat sheet of material, the arm assembly comprising a first actuator arm portion, a second actuator arm portion and a first bendable portion integrally joining the first actuator arm portion to the second actuator arm portion.

The first actuator arm portion may defines a first surface that defines a first through bore, the second actuator arm portion may define a second surface that defines a second through bore that is configured to align with the first through bore and the actuator arm assembly may further comprise a collar that is configured to fit within the first and second through bores to stiffen the actuator arm assembly. The first bendable portion may be configured to bend such that a major surface of the first actuator arm portion faces and is substantially parallel to a major surface of the second actuator arm portion. A second bendable portion may be disposed away from the first bendable portion, the second bendable portion integrally joining the first actuator arm portion to the second actuator arm portion.

The present invention may also be viewed as a head stack assembly for a disk drive, the head stack assembly comprising: an actuator arm assembly comprising an arm assembly stamped from a single flat sheet of material, the arm assembly comprising a first actuator arm portion, a second actuator arm portion and a first bendable portion integrally joining the first actuator arm portion to the second actuator arm portion, and a first head gimbal assembly coupled to the first actuator arm portion;

A second head gimbal assembly may be coupled to the second actuator arm portion. The head stack assembly may further include a coil portion, and an overmold portion configured to attach the coil portion to the arm assembly. The first actuator arm portion may define a first surface that defines a first through bore, the second actuator arm portion may define a second surface that defines a second through bore that is configured to align with the first through bore and the actuator arm assembly may further comprise a collar that is configured to fit within the first and second through bores to stiffen the actuator arm assembly. The first bendable portion may be configured to bend such that a major surface of the first actuator arm portion faces and is substantially parallel to a major surface of the second actuator arm portion. A second bendable portion may be disposed away from the first bendable portion, the second bendable portion integrally joining the first actuator arm portion to the second actuator arm portion.

The present invention, according to still another embodiment thereof, is a disk drive, comprising: a disk, a head stack assembly for reading and writing to the disk, the head stack assembly comprising: an actuator arm assembly comprising an arm assembly stamped from a single flat sheet of material, the arm assembly comprising a first actuator arm portion, a second actuator arm portion and a first bendable portion integrally joining the first actuator arm portion to the second actuator arm portion, and a first head gimbal assembly coupled to the first actuator arm portion.

A second head gimbal assembly may be coupled to the second actuator arm portion. The disk drive may further include a coil portion, and an overmold portion configured to attach the coil portion to the actuator arm assembly. The first actuator arm portion may define a first surface that defines a first through bore, the second actuator arm portion may define a second surface that defines a second through bore that is configured to align with the first through bore and the actuator arm assembly may further comprise a collar that is configured to fit within the first and second through bores to stiffen the actuator arm assembly. The first bendable portion may be configured to bend such that a major surface of the first actuator arm portion faces and is substantially parallel to a major surface of the second actuator arm portion. A second bendable portion may be disposed away from the first bendable portion, the second bendable portion integrally joining the first actuator arm portion to the second actuator arm portion.

The present invention may also be viewed as a method of making an actuator arm assembly for a disk drive, comprising the steps of: providing a flat sheet of material; stamping an arm assembly from the provided sheet of material such that the stamped arm assembly includes a first actuator arm portion, a second actuator arm portion and a first bendable portion integrally joining the first actuator arm portion to the second actuator arm portion. A step of bending the first bendable portion may be carried out such that a major surface of the first actuator arm portion faces and is substantially parallel to a major surface of the second actuator arm portion. The stamping step may create a first through bore in the first actuator arm portion and a second through bore in the second actuator arm portion. After the bending step, the first through bore may be configured to align with the second through bore and the method may further include a step of fitting a collar within the first and second through bores to stiffen the actuator arm assembly. The stamping step may be carried out such that the stamped arm assembly includes a second bendable portion separate from the first bendable portion, the second bendable portion integrally joining the first actuator arm portion to the second actuator arm portion.

The foregoing and other features of the invention are described in detail below and set forth in the appended claims.

DESCRIPTION OF THE PREFERRED EMBODIMENTS

Figure 2:
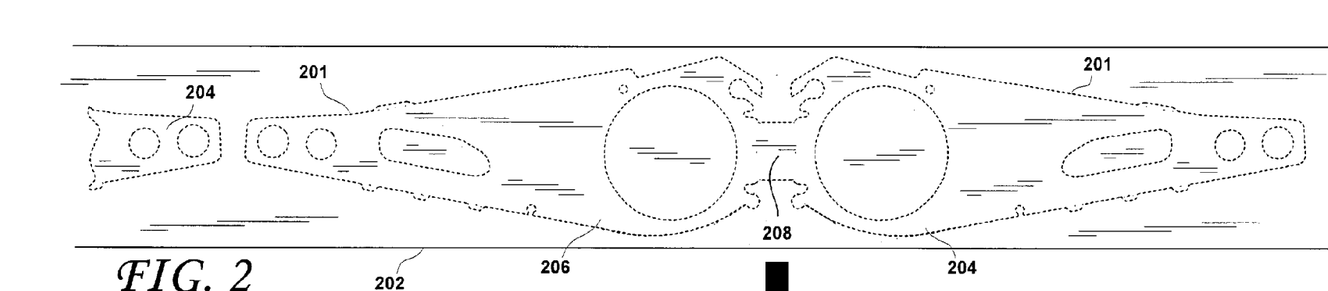
FIG. 2 shows aspects of the method of making a stamped arm assembly, according to an embodiment of the present invention.
Figure 3:
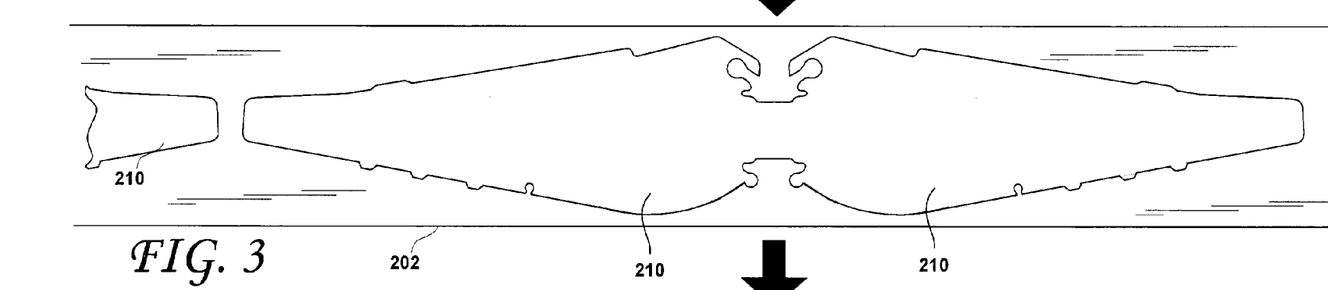
FIG. 3 shows further aspects of the method of making a stamped arm assembly, according to an embodiment of the present invention.
Figure 4:
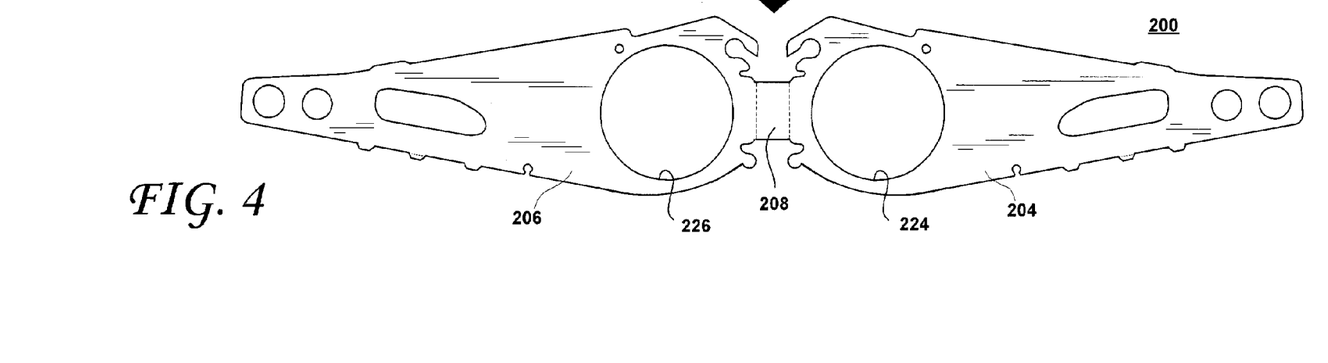
FIG. 4 shows still further aspects of the method of making a stamped arm assembly, according to an embodiment of the present invention.

Rather than forming the constituent arms of an arm assembly using the costly extrusion process of conventional processes, embodiments of the present invention call for the actuator arms to be made together from a stamping process. FIGS. 2–4 show aspects of the method of making a stamped arm assembly, according to an embodiment of the present invention. As shown, the arm assembly 200 may be made by providing a flat sheet of material 202, such as a flat sheet of steel. The embodiment of the present invention shown in FIGS. 2–3 shows the flat sheet of material 202 as being only sufficiently wide to accommodate a single file train of arm assemblies 200. However, the present invention is not limited to such sheets, as the sheet utilized may be dimensioned so as to allow several arm assemblies 200 to be formed side by side. In any event, in the embodiment shown in FIGS. 2–4, the sheet of material 202 is dimensioned so as to allow a plurality of arm assemblies 200 to be formed in a serial fashion, one behind the other. FIG. 1 shows the outline 201 of the arm assembly 200 that will be obtained from the stamping process according to the present invention. FIG. 2 shows a portion of the flat sheet of material 202 after the arm assemblies 200 have been stamped therefrom. As shown, after the arm assemblies 200 have been stamped from the sheet of material 202, the edges of the sheet 202 cut along the outline 201 by the stamping process define the shape of the resultant arm assembly 200. After the stamping process, the sheet of material 202, therefore, defines voids 210 having the shape of the arm assembly 200. FIG. 3 shows the resultant arm assembly 200 stamped from the sheet of material 202, according to an embodiment of the present invention. As shown, each arm assembly 200 stamped from the sheet of material 202 includes a first actuator arm portion 204, a second actuator arm portion 206 and a first bendable portion 208 integrally joining the first actuator arm portion 204 to the second actuator arm portion 206. FIGS. 2–4 show that, according to embodiments of the present invention, the first bendable portion 208 is integrally formed with the first and second actuator arm portions 204, 206, from the same sheet of material 202 and at the same time and by the same stamping process. The first bendable portion 208 joins the actuator arm portions 204, 206, which are arranged in a mirrored orientation relative to one another. The stamping process according to embodiments of the present invention may also form all of the required features of the arm assembly 200 such as, for example, a first through bore defined within the first actuator arm portion 204 and a second through bore defined within the second actuator arm portion 206 and other desired structural features.

Figures 5, 6:
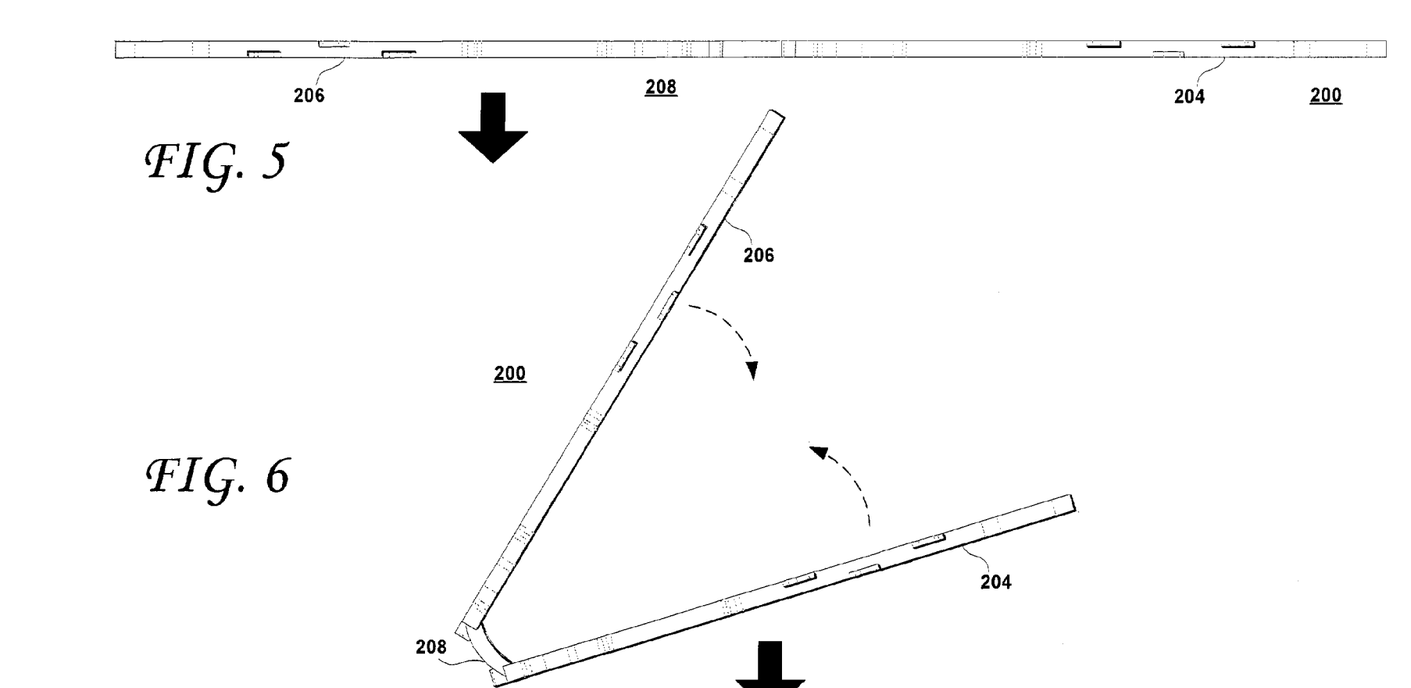
FIG. 5 shows a side view of a stamped arm assembly, according to an embodiment of the present invention.
FIG. 6 shows a side view of the stamped arm assembly of FIG. 5 in a partially bent configuration.
Figure 7:
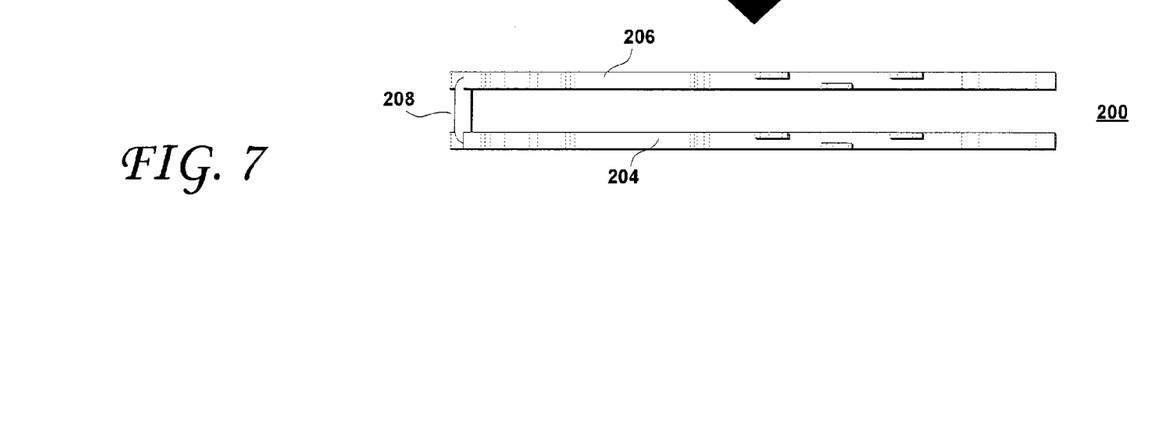
FIG. 7 shows a side view of the stamped arm assembly of FIG. 5 in its final configuration.

FIG. 5 shows a side view of a stamped arm assembly 200, according to an embodiment of the present invention. The side view of FIG. 5 shows the stamped arm assembly 200 in a configuration after the stamping process, but before the arm assembly is made to assume its final configuration. As shown, the arm assembly 200 is a flat assembly having the thickness of the sheet of material from which it was stamped. The edge of first and second actuator arm portions 204, 206 is visible, as is the first bendable portion 208. The arm assembly 200 may then be bent as suggested by FIG. 6. That is, the first bendable portion 208 may be bent such that the major surfaces of the first and second actuator arm portions 204, 206 are substantially parallel to one another, as shown in FIG. 7. As shown, the bending occurs at the first bendable portion 208, and 8 the first and second actuator arm portions 204, 206 are maintained substantially straight and unbent. The first bendable portion 208 may be shaped such that is bends uniformly along its entire length, or may be bend such that the majority of the bending occurs near the first and second arm portions 204, 206. However the bending is accomplished, the end result is the arm assembly 200 shown in FIG. 7, in which the major surfaces of the first and second actuator arm portions 204, 206 are parallel or substantially parallel to one another, with first bendable portion 208 generally perpendicular to such major surfaces and integrally joining the first and second actuator arm portions 204, 206.

Figure 8:
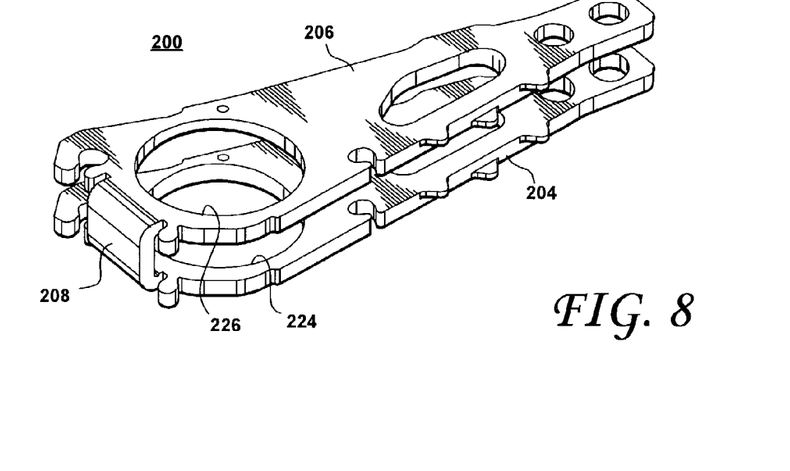
FIG. 8 is a side perspective view of a stamped arm assembly according to an embodiment of the present invention.
Figure 9:
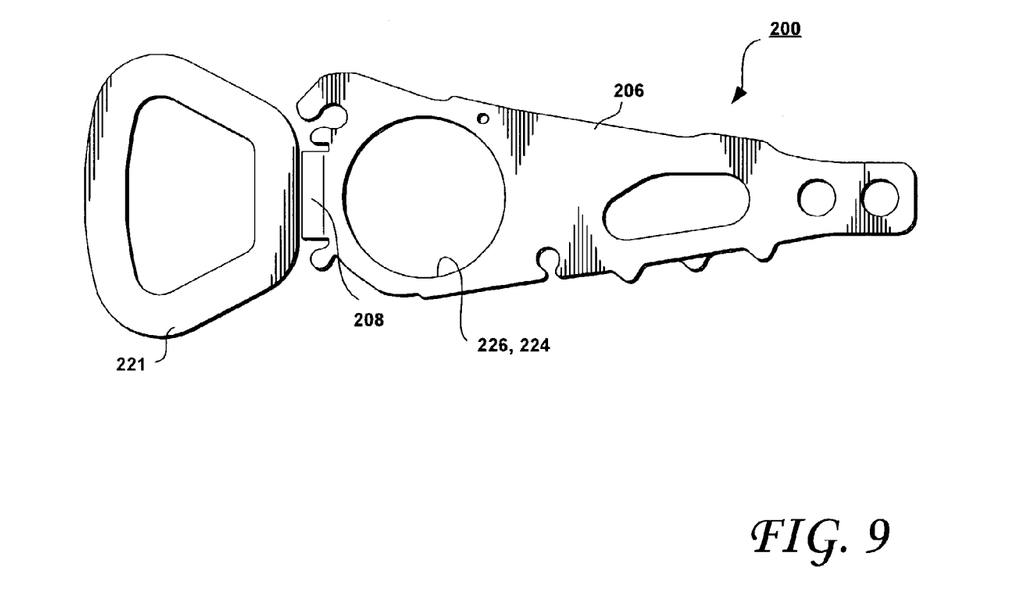
FIG. 9 is a plan view of a stamped arm assembly and a coil portion, according to an embodiment of the present invention.
Figure 10:
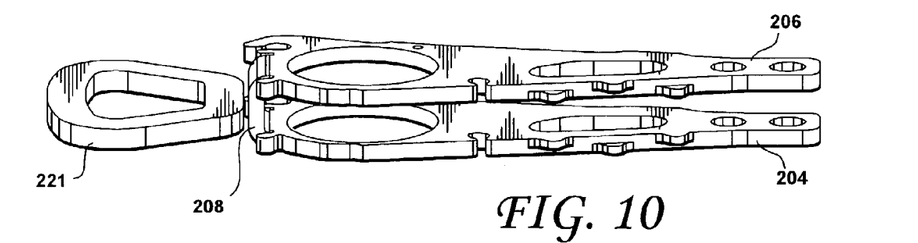
FIG. 10 is an exploded view of a portion of the stamped arm assembly and coil portion of FIG. 9.

FIG. 8 is a side perspective view of the resultant arm assembly 200. As shown, the first bendable portion 208 integrally joins the first actuator arm portion 204 to the second actuator arm portion 206. It should be noted that the embodiment shown in FIG. 8 shows but one example of a bendable portion that integrally joins the first and second actuator arm portions 204, 206 and that other structures are possible, as those of skill in this art may recognize. FIGS. 9 and 10 illustrate the manner in which the coil portion 221 of the head stack assembly may be arranged relative to the arm assembly 200, prior to attaching the coil portion 221 to the arm assembly 200. For example, the coil portion 221 may be coupled to the arm assembly 200 by means of an adhesive or by a plastic overmolding process, as is shown in FIG. 13 and described hereunder.

The arm assembly 200 may be stamped in such a manner as to create a first surface 224 in the first actuator arm portion 204 that defines a first through bore and to create a second surface 226 in the second actuator arm portion 206 that defines a second through bore. As shown, the first and second surfaces 224, 226 are configured such that the first through bore is aligned with the second through bore. According to an embodiment of the present invention, the arm assembly 200 includes a collar 214 that is configured to fit within the first and second through bores to stiffen the arm assembly 200 and to enable the head stack assembly incorporating the present arm assembly 200 to pivot over the recording surface(s) of the disk(s) of the disk drive.

Figure 11:
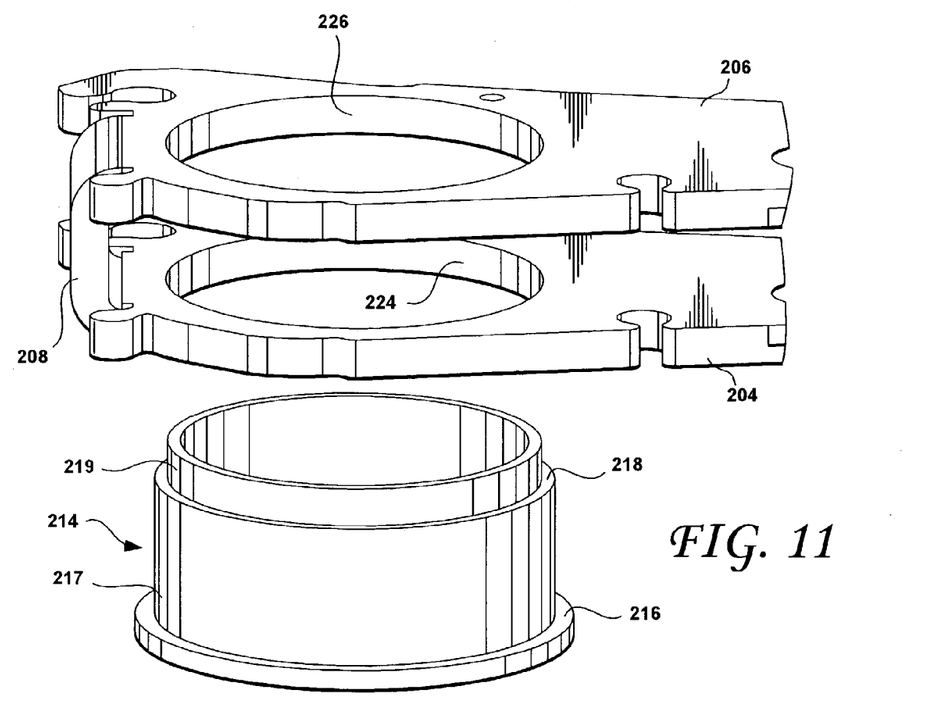
FIG. 11 is a detail of a side perspective view of a stamped arm assembly and an arm assembly collar, according to an embodiment of the present invention.
Figure 12:
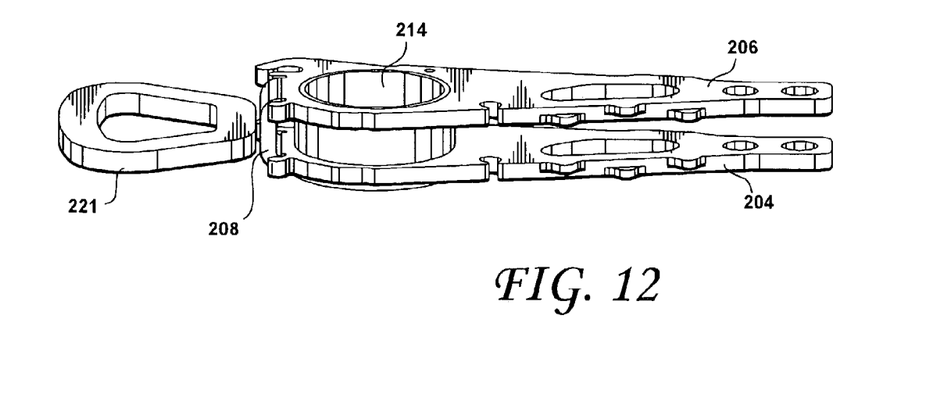
FIG. 12 is a side perspective view of the stamped arm assembly of FIG. 11, shown with the collar fitted thereto.

FIG. 11 is a detail view of the arm assembly 200, and illustrates the manner in which the collar 214 may be fitted thereto. As shown, the collar 214 may be generally cylindrical in shape and may define a first lip surface 216, a second lip surface 218, a first collar surface 217 extending between the first and second lip surfaces 216, 218 and perpendicular thereto, and a second collar surface extending from the second lip surface 218 to the free end of the collar 214. To fit the collar 214 to the arm assembly 200 as shown in FIG. 12, the collar 214 is advanced through the first and second through bores of the first and second actuator arm portions 204, 206 until the first lip 216 of the collar 214 abuts the first actuator arm portion 204 and the second lip 218 abuts the second actuator arm portion 206. In this manner, the first collar surface 217 is fitted against the first surface 224 of the first actuator arm portion 204 and the second collar surface 219 is fitted against the second surface 226 of the second actuator arm portion 206. Both the collar 214 and the first bendable portion 208 of the arm assembly 200 serve to, among other functions, to further stiffen the assembly 200 and to eliminate or reduce the effects of unwanted resonance modes (e.g., to push unwanted resonance modes to higher and less performance affecting frequencies).

Figure 13:
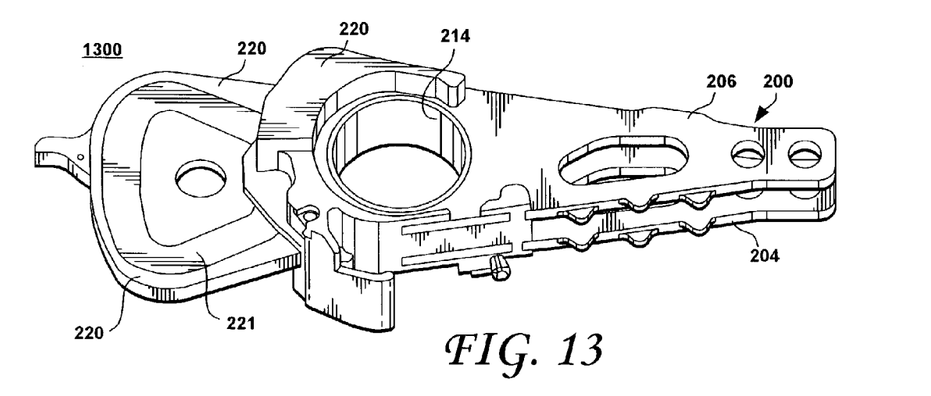
FIG. 13 is a side perspective view of an actuator arm assembly according to an embodiment of the present invention.

FIG. 13 shows an actuator arm assembly 1300 according to an embodiment of the present invention. The arm assembly 200 is shown in FIG. 13 fitted with the collar 214 and with the coil portion 221 coupled to the arm assembly 200 by means of a plastic overmold 220. As noted above, other means of coupling the coil portion 221 to the arm assembly 200 may be utilized, such as an adhesive, for example.

Figure 14:
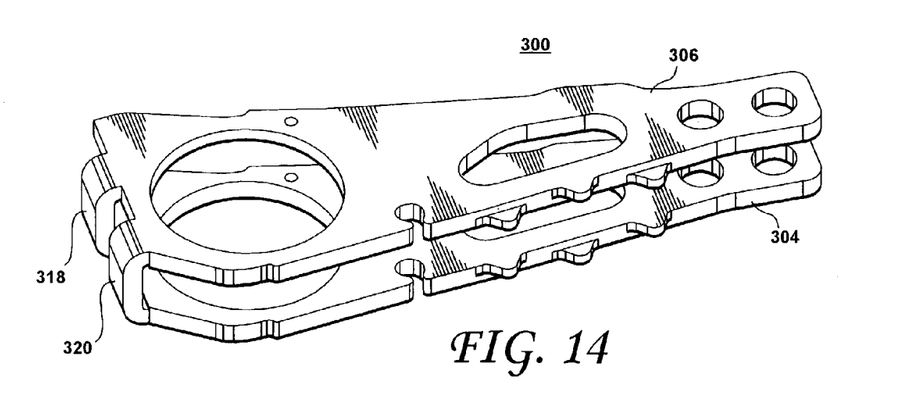
FIG. 14 is a side perspective view of a stamped arm assembly, according to another embodiment of the present invention.
Figure 15:
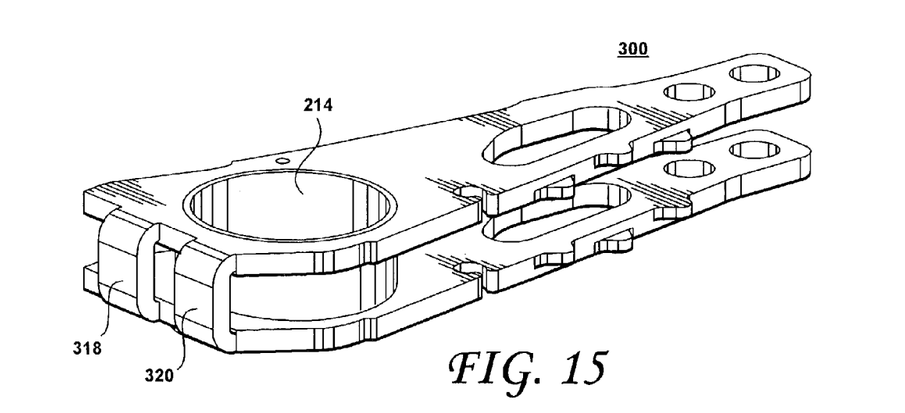
FIG. 15 is a side perspective view of the stamped arm assembly of FIG. 14, shown with the collar fitted thereto.

As shown in FIG. 14, other embodiments of the present invention call for the present stamped arm assembly to define both a first bendable portion 318 and a second bendable portion 320 disposed away from the first bendable portion 318. In this embodiment, both the first bendable portion 318 and the second bendable portion 320 integrally join the first actuator arm portion 304 to the second actuator arm portion 306. The first and second bendable portions 318, 320 further stiffen the assembly 300 and eliminate or further reduce unwanted resonance modes. The stiffness of the arm assembly 300 is increased when the collar 214 is fitted thereto, as shown in FIG. 15.

Figure 16:
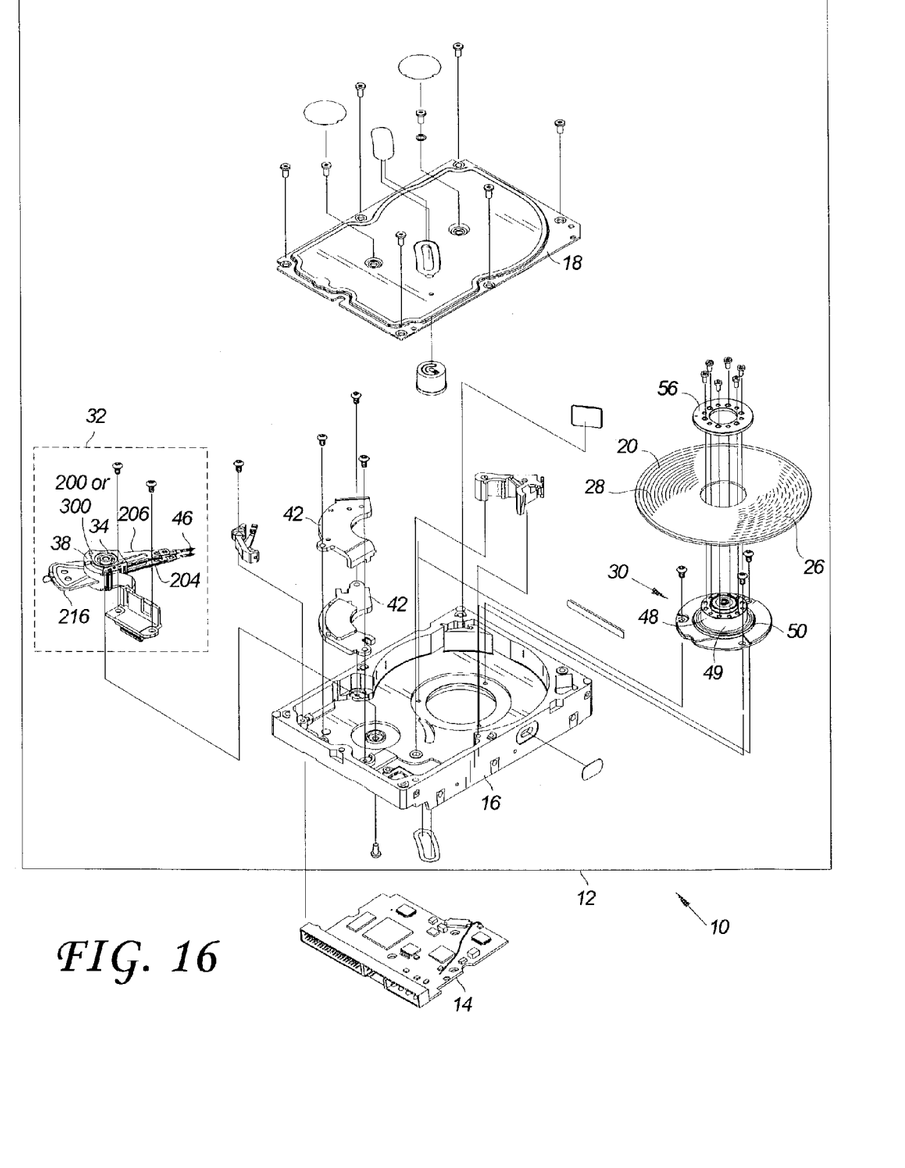
FIG. 16 is an exploded view of a disk drive according to an embodiment of the present invention.

FIG. 16 is an exploded perspective view of a disk drive 10 incorporating aspects of embodiments of the present invention. As shown, the disk drive 10 includes a HDA 12 and a PCBA 14. The HDA 12 includes a disk drive base 16 and a cover 18 that collectively house one or more magnetic disks 20. The magnetic disk 20 contains a plurality of tracks for storing data. The magnetic disk 20 may be two-sided, and thus for example, the magnetic disk 20 is shown having tracks 26 on an upper facing side and tracks 26 (shown in phantom lines) on a lower facing side. The head disk assembly 12 further includes a spindle motor 30 for rotating the magnetic disk 20. The head disk assembly 12 further includes a HSA 32 and a pivot-bearing cartridge 34. The head stack assembly 32 includes an actuator arm assembly 1300 that include an arm assembly 200 or 300, according to an embodiment of the present invention.

The arm assembly 200 or 300 includes an actuator body 38 that defines a bore and the pivot-bearing cartridge 34 engaged within the bore for facilitating the actuator arm assembly 1300 to rotate between limited positions. A coil portion 221 may be coupled to the arm assembly 200, 300. The coil portion 221 extends from one side of the actuator body 38 to interact with a pair of permanent magnets 42 to form a VCM for pivoting the HSA 32. First and second actuator arm portions 204, 206 extend from an opposite side of the actuator body 38. A head gimbal assembly may be attached to the first actuator arm portion 204 and/or to the second actuator arm portion 206. Each head gimbal assembly includes a head (the uppermost one being denoted 46) for reading and writing data to and from a respective recording surface of the disk 20. In the case wherein only one head gimbal assembly is required (i.e., when the disk 20 only has one recording surface), a compensating weight equivalent to the weight of the missing head gimbal assembly may be attached to the actuator arm portion from which the head gimbal assembly is missing, to preserve the balance of the HSA 32.

The embodiments described and shown herein are illustrative and are not intended to limit the scope of the present invention. Those of skill in this art may recognize that modifications of the described embodiments are possible.

What is claimed is:

1. An actuator arm assembly for a disk drive, the actuator arm assembly comprising:
   an arm assembly stamped from a single flat sheet of material, the arm assembly comprising a first actuator arm portion that defines a first through bore, a second actuator arm portion that defines a second through bore that is configured to align with the first through bore and a first bendable portion integrally joining the first actuator arm portion to the second actuator arm portion and,
   a collar that is configured to fit within the first and second through bores to stiffen the actuator arm assembly.

2. The actuator arm assembly of claim 1, wherein the first bendable portion is configured to bend such that a major surface of the first actuator arm portion faces and is substantially parallel to a major surface of the second actuator arm portion.

3. The actuator arm assembly of claim 1, further comprising a second bendable portion disposed away from the first bendable portion, the second bendable portion integrally joining the first actuator arm portion to the second actuator arm portion.

4. A head stack assembly for a disk drive, the head stack assembly comprising:
   an actuator arm assembly comprising an arm assembly stamped from a single flat sheet of material, the arm assembly comprising a first actuator arm portion that defines a first through bore, a second actuator arm portion that defines a second through bore that is configured to align with the first through bore, a collar that is configured to fit within the first and second through bores to stiffen the actuator arm assembly and a first bendable portion integrally joining the first actuator arm portion to the second actuator arm portion, and
   a first head gimbal assembly coupled to the first actuator arm portion.

5. The head stack assembly of claim 4, further including a second head gimbal assembly coupled to the second actuator arm portion.

6. The head stack assembly of claim 4, further including:
   a coil portion, and
   an overmold portion configured to attach the coil portion to the arm assembly.

7. The head stack assembly of claim 4, wherein the first bendable portion is configured to bend such that a major sure of the first actuator arm portion faces and is substantially parallel to a major surface of the second actuator arm portion.

8. The head stack assembly of claim 4, further comprising a second bendable portion disposed away from the first bendable portion, the second bendable portion integrally joining the first actuator arm portion to the second actuator arm portion.

9. A disk drive, comprising:
   a disk;
   a head stack assembly for reading and writing to the disk, the head stack assembly comprising:
   an actuator arm assembly comprising an arm assembly stamped from a single flat sheet of material, the arm assembly comprising a first actuator arm portion that defines a first through bore, a second actuator arm portion that defines a second through bore that is configured to align with the first through bore, a collar that is configured to fit within the first and second through bores to stiffen the actuator arm assembly and a first bendable portion integrally joining the first actuator arm portion to the second actuator arm portion, and
   a first head gimbal assembly coupled to the first actuator arm portion.

10. The disk drive of claim 9, further including a second head gimbal assembly coupled to the second actuator arm portion.

11. The disk drive of claim 9, further including:
    a coil portion, and
    an overmold portion configured to attach the coil portion to the actuator arm assembly.

12. The disk drive of claim 9, wherein the first bendable portion is configured to bend such that a major surface of the first actuator arm portion faces and is substantially parallel to a major surface of the second actuator arm portion.

13. The disk drive of claim 9, further comprising a second bendable portion disposed away from the first bendable portion, the second bendable portion integrally joining the first actuator arm portion to the second actuator arm portion.

14. A method of making an actuator arm assembly for a disk drive, comprising the steps of:
    providing a flat sheet of material;
    stamping an arm assembly from the provided sheet of material such that the stamped arm assembly includes a first actuator arm portion that defines a first through bore, a second actuator arm portion that defines a second through bore and a first bendable portion integrally joining the first actuator arm portion to the second actuator arm portion;
    bending the first bendable portion such that a major surface of the first actuator arm portion faces and is substantially parallel to a major surface of the second actuator arm portion and such that the first through bore aligns with the second through bore, and
    fitting a collar within the first and second through bores to stiffen the actuator arm assembly.

15. The method of claim 14, wherein the stamping step creates a first through bore in the first actuator arm portion and a second through bore in the second actuator arm portion.

* * * * *